Search Room

Nov. 7, 1933. W. J. WILLIAMS Re. 18,991

APPARATUS FOR AND METHOD OF HANDLING FILMS OR OTHER ARTICLES

Original Filed Aug. 6, 1928 5 Sheets-Sheet 1

INVENTOR
WALTER J. WILLIAMS
BY
Joseph T. O'Brien
ATTORNEY

95. PHOTOGRAPHY.
89

Search Room

Nov. 7, 1933. W. J. WILLIAMS Re. 18,991

APPARATUS FOR AND METHOD OF HANDLING FILMS OR OTHER ARTICLES

Original Filed Aug. 6, 1926 5 Sheets-Sheet 2

INVENTOR
WALTER J. WILLIAMS
BY
Joseph F. O'Brien
ATTORNEY

95. PHOTOGRAPHY.

Search Room.

89

Nov. 7, 1933. W. J. WILLIAMS Re. 18,991

APPARATUS FOR AND METHOD OF HANDLING FILMS OR OTHER ARTICLES

Original Filed Aug. 6, 1926 5 Sheets-Sheet 3

INVENTOR
WALTER J. WILLIAMS
BY
Joseph J. O'Brien
ATTORNEY

89

Nov. 7, 1933. W. J. WILLIAMS Re. 18,991

APPARATUS FOR AND METHOD OF HANDLING FILMS OR OTHER ARTICLES

Original Filed Aug. 6, 1926 5 Sheets-Sheet 4

INVENTOR
WALTER J. WILLIAMS
BY
Joseph F. O'Brien
ATTORNEY

Search Room

95. PHOTOGRAPHY.

89

Nov. 7, 1933. W. J WILLIAMS Re. 18,991

APPARATUS FOR AND METHOD OF HANDLING FILMS OR OTHER ARTICLES

Original Filed Aug. 6, 1926 5 Sheets-Sheet 5

INVENTOR
WALTER J. WILLIAMS
BY
Joseph T. O'Brien
ATTORNEY

PHOTOGRAPHY.
89
Search Room

Reissued Nov. 7, 1933

Re. 18,991

UNITED STATES PATENT OFFICE 18,991

APPARATUS FOR AND METHOD OF HANDLING FILMS OR OTHER ARTICLES

Walter J. Williams, Woodhaven, N. Y.

Original No. 1,842,890, dated January 26, 1932, Serial No. 127,547, August 6, 1926. Application for reissue November 17, 1932. Serial No. 643,014

26 Claims. (Cl. 95—89)

This invention relates to improvements in apparatus for and methods of handling films or other articles.

Some of the objects of this invention are to produce a novel film-developing apparatus in which the number or size of the films handled may be greatly increased; in which film-carriers preferably of large film-carrying area and adapted to carry a plurality of films are loosely mounted and means is provided for mechanically conveying such loosely-mounted film-carriers to move films in immersed condition through a receptacle having a plurality of separate containers adapted to contain developing liquids; to provide novel conveyor mechanism which automatically engages, moves and disengages from each carrier and preferably advances the carriers through a container by a series of lifting, conveying and depositing movements; to provide means whereby a carrier of increased film-carrying area or a series of such carriers may be subjected to successive lifting, conveying and depositing movements through treating zones within solutions contained in said containers; also to provide improved means by which such a carrier or a plurality of such carriers may be elevated out of one container, moved or shifted across the container walls or partitions and lowered into the next container; to provide means for accurately measuring the time period during which the films are subjected to the action of the treating solutions in the various sections of the treating zone; to provide means whereby the time period of subjection of a film or films to the liquid in a zone section or container may be varied if desired; to provide a means whereby the length of each of the film-immersing movements of a carrier through the zones or containers will be accurately similar; to provide means whereby the conveyor mechanism will be greatly simplified and improved and the usual clumsy conveyor chains together with the rattling and sagging thereof will be eliminated; to provide means for examining the film in wet condition preferably comprising means for elevating a carrier with its film or films into an examination zone at the end of the movement through the treating zones in the containers, preferably combined with lighting means in said zone for examining the film or films in wet developed condition; to provide means for secondarily further elevating the carrier and films preferably from the said examining zone into a drying chamber and to cause the depositing of the same on conveyor means within said chamber.

Still other objects of my invention are to provide a single simple mechanism adapted to simultaneously move in the way specified all the film-carriers in the various sections of the treating zone, and to provide a simple single elevating, shifting, and lowering mechanism which will be adapted to handle simultaneously all those film carriers which have reached the ends of the sections of the treating zones and to lift such carriers out of the containers in treating zone sections in which it is immersed and lower it into the next succeeding container or zone-section; also to utilize the elevating and lowering member of such mechanism for the purpose of actuating a plurality of shifting members to simultaneously shift the film carriers as aforesaid; also to utilize said elevating and lowering member for actuating mechanism at a predetermined point in the cycle of movement of said elevating and lowering member to produce a secondary elevation of the carriers into a drying chamber; also to utilize said elevating and lowering member to procure an intermittent movement of the conveying means within the drying chamber or zone; also to provide on said elevating and lowering member simple carrier-engaging or gripping means which will, during the downward movement of said elevating and lowering member slide over the carrier bars but which will positively engage the same on the upward movement to effect a transfer of the carriers to said elevating and lowering mechanism; also to provide means which will positively effect a transfer of the carrier bar or carrier bars from the primary elevating member to the secondary elevating mechanism for moving carriers into the drying chamber.

Still another object of my invention is to provide a method of handling films whereby a plurality or group of films may be suspended from a single carrier and moved successively through treating solutions; to provide a method whereby a group of films may be successively immersed in and moved through treating zones in adjacent containers containing treating liquids and will have a raising and lowering movement therein preferably combined with the conveying movement thereof; also to provide a method for successively transferring a carrier and group of films as a unit at the end of its travel or movement through each treating-zone section from one container to another; also to provide a method of handling films whereby a carrier with a plurality of films are moved at different rates of speed respectively during immersion in the treating-zone sections and during transfer from one container to another and to provide a method by which the transfer from one container or zone section to another is synchronized with the conveying movement and preferably is transferred in the same time period as the conveyer mechanism takes to make a single step in its raising, conveying and depositing movement; also to provide a method by which the films on a single carrier are at the end of the travel through all the treating zones transferred or shifted to a portion of the elevating mechanism and elevated into an examination zone wherein said carrier may be illuminated and thereafter said films are again shifted to another elevating mechanism to further elevate them into a drying zone or chamber and to position the carrier on a conveyor mechanism caused to move intermittently through said drying chamber.

Other objects are to free the films within the solutions from bubbles and to produce increased movement of the film within the liquids.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:—

Figure 1:
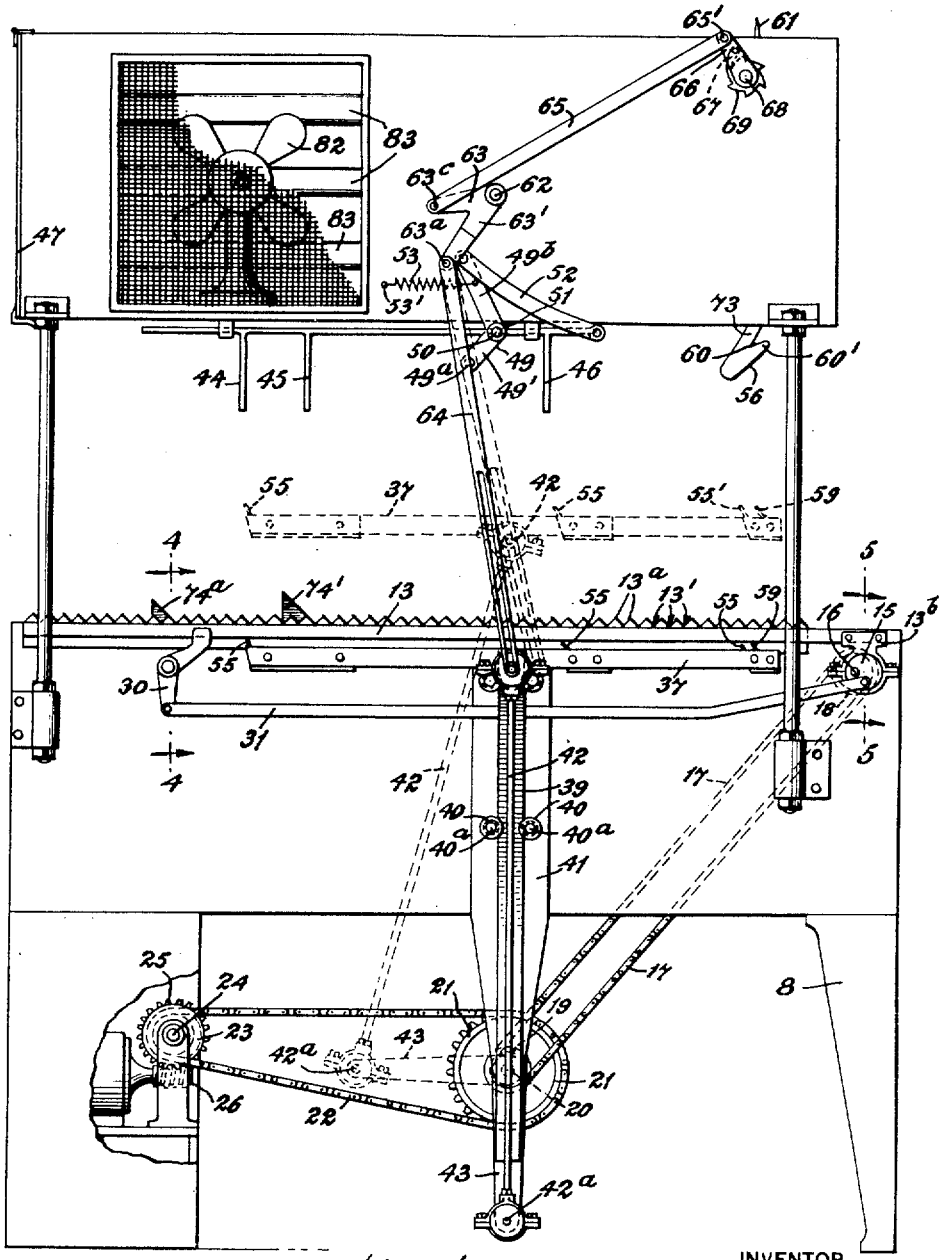
Fig. 1 is a side elevation of a machine embodying my invention.
Figure 2:
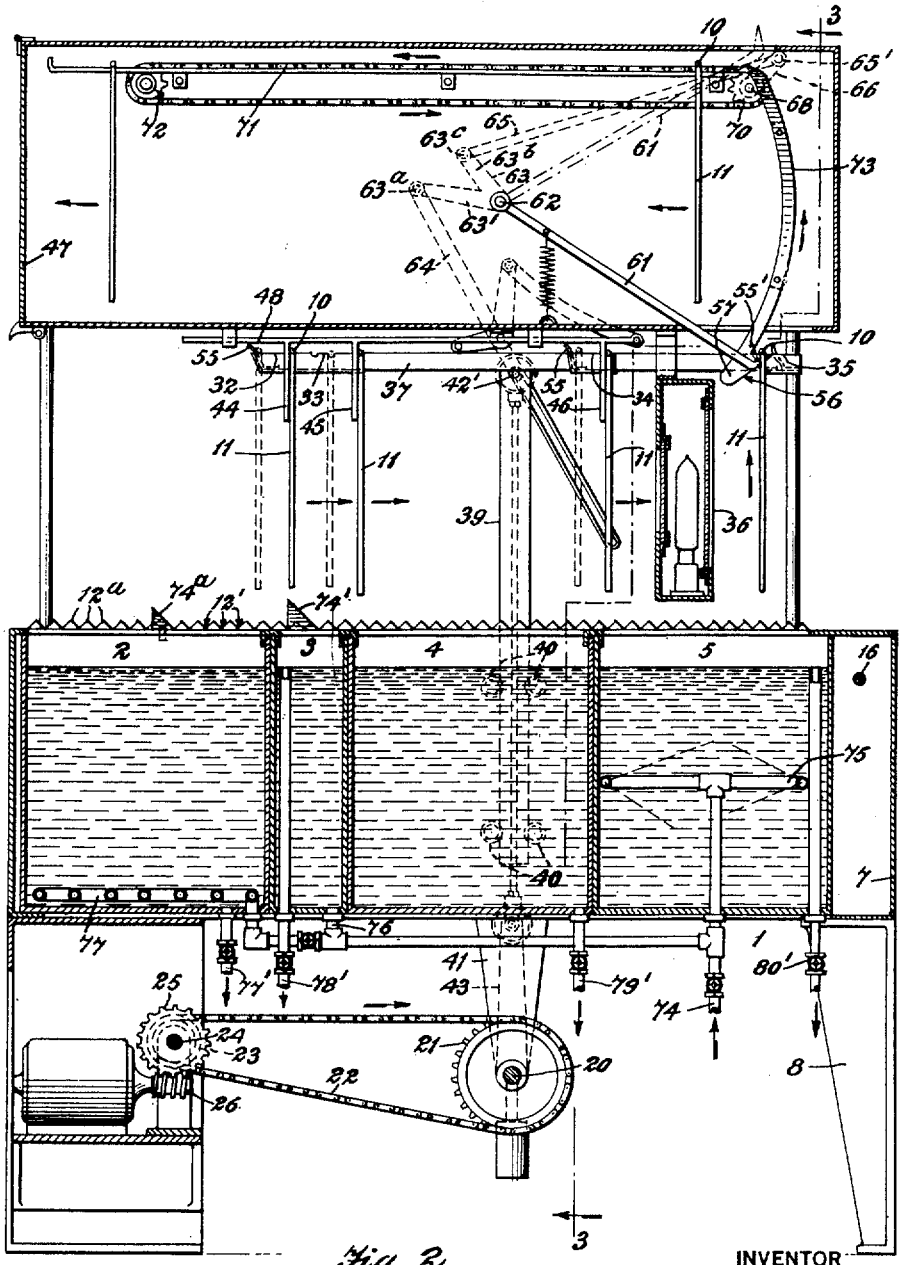
Fig. 2 is a vertical, longitudinal section on the line 2—2 of Fig. 3, looking in the direction of the arrow.
Figures 3, 4, 5:
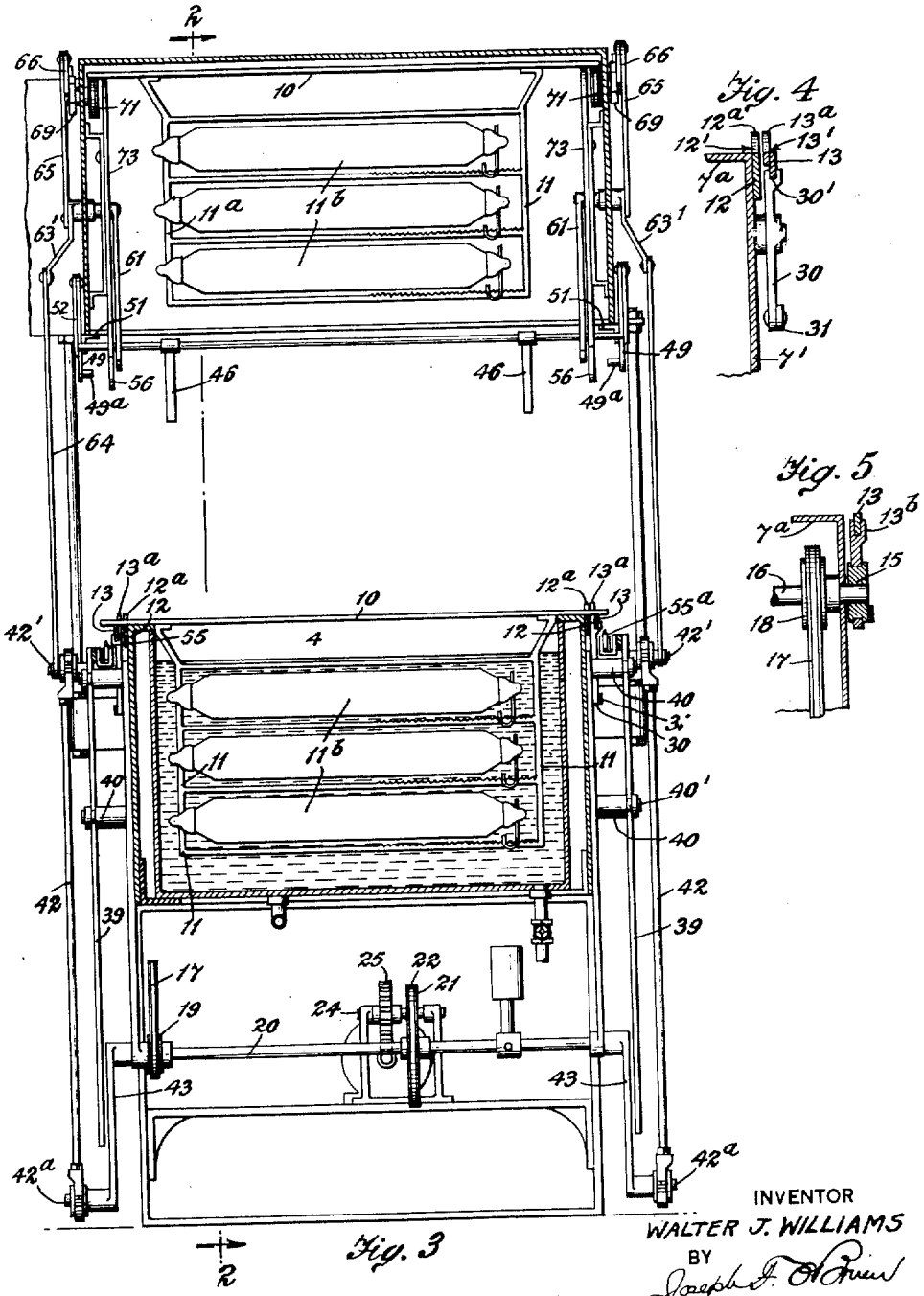
Fig. 3 is a transverse section on the line 3—3 of Fig. 2 looking in the direction of the arrow.
Fig. 4 is a section on the line 4—4 of Fig. 1, looking in the direction of the arrow.
Fig. 5 is a section on the line 5—5 of Fig. 1, looking in the direction of the arrow.
Figure 6:
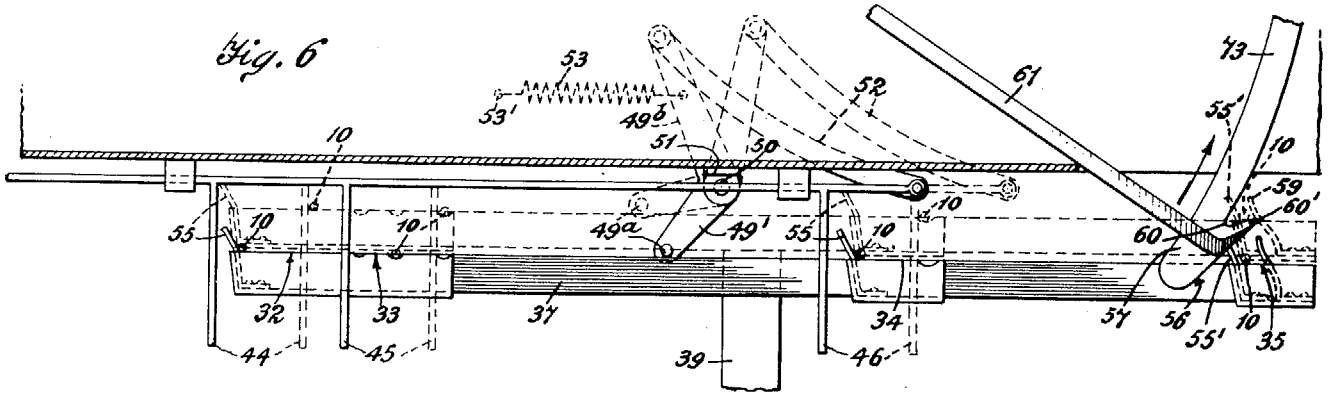
Fig. 6 is an enlarged fragmentary longitudinal section of the carrier-shifting mechanism and associated parts.
Figure 7:
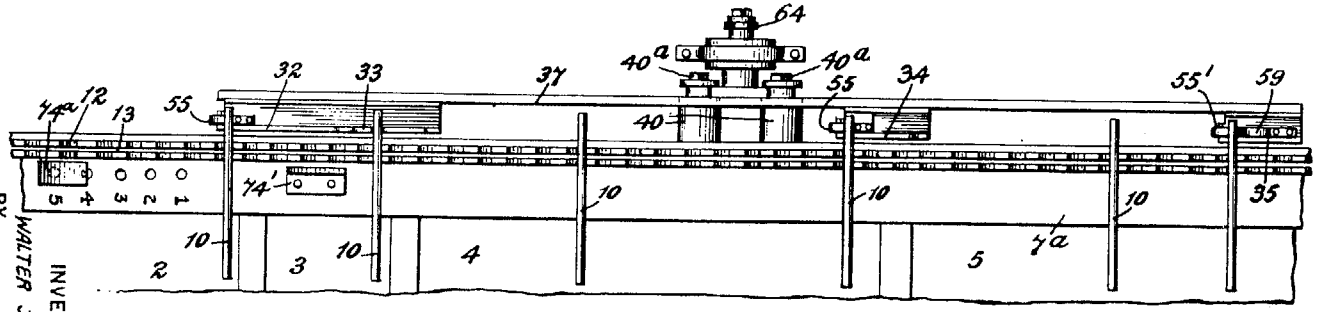
Fig. 7 is an enlarged fragmentary plan view of one side of the liquid containers and conveyor mechanism, the drying chamber of the machine being removed.
Figure 8:
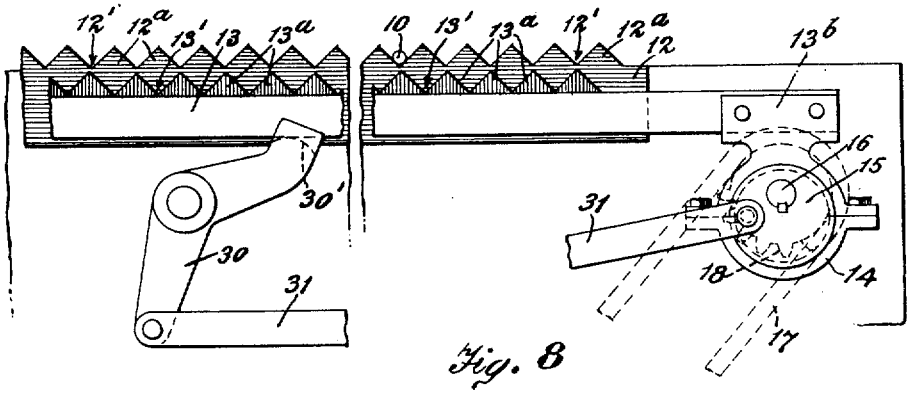
Figs. 8 and 9 are enlarged elevations, each composed of two related fragments and showing varying positions of the mechanism conveying carriers through the liquids.
Figure 9:
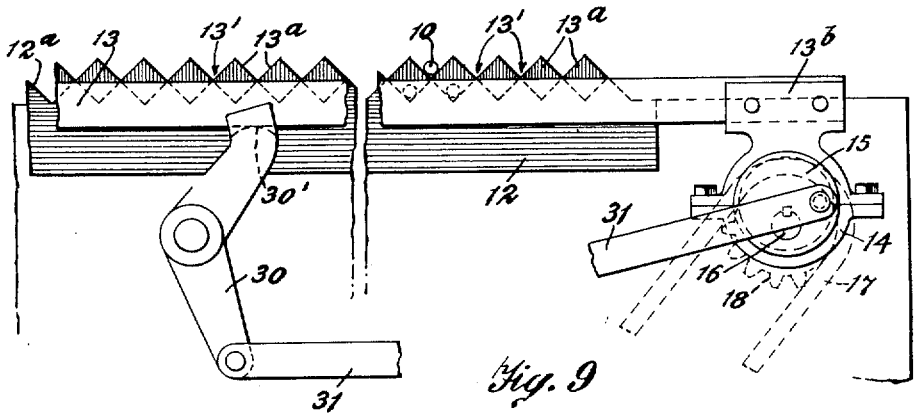

Referring now to these drawings which illustrate a preferred embodiment of my invention, 1 indicates a receptacle for a series of treating solutions, which in the embodiment shown, is made of metal lined with porcelain and, as illustrated, comprises a series of four independent containers, 2, 3, 4 and 5 arranged adjacent to each other and having abutting walls, 2′—3′, $3^a$—4′, and $4^a$—5′. These abutting walls of the containers are connected by inverted channel members 6 and are positioned within an upper frame member 7 which is in turn supported upon a lower base or frame member 8. The separate containers or tanks are thus arranged to form sections of a continuous receptacle for treating solutions which comprises a series of abutting and connected through independent sections. These containers are preferably of similar width and are supported on an upper frame of such width as to leave spaces between the sides of the containers and side frame plates 7′ which are provided with inwardly directed flanges $7^a$ at its upper end to form table portions at opposite sides of said receptacle. The formation of the receptacle of a series of tanks enables porcelain-lined metal containers to be employed, thus insuring against leakage and permitting more ready knocking down and the shipment of the machine in more compact form.

In the preferred embodiment of my invention, a single wide film of large or increased area or a series or group of narrower films are mounted on a horizontally-disposed carrier bar 10 and, as illustrated, three films are arranged in vertical series connected at their opposite ends to a frame or rack 11 composed of a pair of vertically-disposed carrier-bars $11^a$ and horizontal strips $11^b$ which are preferably provided with teeth or notches to permit the mounting thereon of film strips of varying lengths by means of clips $11^c$. The said frame or rack extends vertically within the liquid in the tanks and the vertical bars thereof are attached at their upper end to said horizontally-disposed carrier bar 10 which is of greater length than the width of the containers and adapted to extend beyond the side edges of the containers and over table flanges $7^a$ to rest loosely on and be moved by conveyor mechanism arranged at the sides of said tanks. I thus provide a carrier adapted to carry, as a single unit, a plurality or group of narrow films or a single film or like photographic unit of wide or increased area which it is desired to develop and an important feature of this invention resides in the mechanical manipulation of these horizontal bars with a film or films attached thereto.

I preferably provide novel conveyer mechanism which moves the carrier through the treating liquids in the containers which I shall hereinafter refer to as the immersing zones by a series of lifting, conveying and depositing movements, the conveying mechanism engaging, moving and disengaging such bars at each step of the movement, and at the end of its movement through an immersing zone section or tank the bars are elevated vertically to lift the frame and films out of such tank into an elevated position in which it is shifted across the tank walls or partition and then lowered vertically into the next tank, and at the end of the passage through all said immersing zones, the carrier is again elevated into an examining zone to be examined through suitable examining elements and said bar and films are subsequently again transferred from the initial elevated position by a secondary elevating mechanism which elevated the bar and films into a higher position in the drying chamber and into contact with suitable conveying mechanism within said chamber.

In the preferred embodiment of my machine shown, the conveyor mechanism embodies duplicate elements arranged on each side of the receptacle or container, each conveying element in the preferred embodiment comprising a pair of cooperating members composed of a stationary member and a movable member, the duplicate members of each pair having a series of notches adapted to receive the opposite ends of the bars 10. Thus each of the stationary members 12 are provided with a series of notches 12′ and a series of pointed inter-notch teeth $12^a$ provided with inclined sides.

As shown, the stationary members 12 are fastened to the side sheathing plates 7′. The movable member 13 of each pair is provided with similarly spaced notches 13′ and teeth $13^a$ therebetween and is arranged to have a combined ver-

PHOTOGRAPHY.
89 tical and horizontal movement so that one of its notches 13′ moves across the positions of a plurality of notches in the stationary member and preferably moves across the positions of two of such notches crossing one notch on its upward movement and crossing an adjacent notch on its downward movement, so that the registering notches of the duplicate movable members will engage a carrier bar and it will be lifted out of the notches in the stationary member and be moved forwardly into the next forward notches of the duplicate stationary members.

In the preferred embodiment illustrated, the movable members are operated at one end of the said movable bars on collars or straps 14 loosely mounted on disks 15 eccentrically mounted at opposite ends of a shaft 16 rotated in any suitable manner and as shown connected at 13[b] by suitable power transmitting mechanism comprising a sprocket chain 17, sprocket wheel 18, on said shaft 16 to a sprocket wheel 19 on a shaft 20 rotated by a sprocket 21, chain 22 and sprocket 23 from the shaft 24 which is rotated by a worm wheel 25 from a worm 26 to the shaft 27 of the motor 28. The opposite ends of each of said bars are raised and lowered and guided in its conveying longitudinal movement by providing the disks 15 with crank pins 29 and operating bell crank levers 30 by elongated links 31 to raise and lower said opposite ends of said bars, said bell crank levers 30 being provided with grooves 30′ to permit a sliding movement of said conveyer member relative thereto.

It will be seen that each of these carrier bars rest loosely within the notches of the conveyer members; that said members extend the full length of the receptacle crossing the various immersing zone sections or containers thereof and that if operating alone, said movable conveying members which have an elliptical movement across the plane in which the carrier bars are supported on the stationary members, would pile the carrier bars up at each wall of an immersing zone section or container and in order to lift the carrier bars out of a zone section or container when it reaches the end thereof, I provide independent mechanism synchronized with said conveyer mechanism but moving at a relatively higher speed for the purpose of elevating these carrier bars to lift or elevate such of the carrier bars as have reached positions adjacent to the end walls of the containers in which the carriers are immersed and during such elevation to mechanically shift said carriers across the said walls into a position adjacent to the abutting wall of the next container and then to lower the same into submersion in said next container. This elevating, shifting and lowering movement is preferably, as aforesaid, a mechanism independent from the carrier conveying mechanism and is timed to operate at a rate of speed that will permit complete elevation, shifting and lowering during one step of the carrier-conveying mechanism.

In the preferred embodiment of my invention, four containers are employed and three transfer platforms 32, 33 and 34 respectively are positioned to correspond with the abutting walls or partitions, and are utilized to raise, shift and lower the said carrier bars, as aforesaid. The second container, however, is so short that I have combined the two platforms for transferring the carrier across the abutting walls 2′—3′ and 3[a]—4′. I also preferably provide a transfer platform 35 at the end of the machine adapted to elevate and transfer the carrier which has completed its movement through the immersing zone of the machine into a position adjacent to an illuminating box 36, where it may be examined in wet condition to determine whether it has been properly treated and from which position it may, if desired, be manually removed and repositioned in the immersing zone for further treatment.

In the preferred embodiment of my invention, all four duplicate transfer platforms are operated conjointly and connected together by longitudinal bars 37 which are connected to said platforms and extend longitudinally of the machine outside or beyond the vertical plane of the ends of those carrier bars which are still being conveyed through the immersing solutions so that only those bars reaching the transfer zone will be elevated, while the remaining bars will be undisturbed in their conveying movement through the treating solutions or liquids.

My preferred means for elevating all of these bars within the transfer zones simultaneously comprises a vertically movable guide bar 39 guided to move in a vertical path only at its opposite side edges in oppositely disposed grooves 40′ formed between bearing sleeves 40, on stub shafts 40[a] mounted on stationary bearing plates 41 and held in place on said stub shafts by nut 40[b]. Vertical reciprocating movement is imparted to said platform connecting bar 37 through connecting rods 42 pivoted at 42′ at its upper end to said bar 37 and having a pivotal connection 42[a] at its lower end with crank members 43 mounted on a shaft 20. The pivotal connections between the said bars and crank members and between the said connecting bars and platform connecting bars may be of any suitable form and, as illustrated, each of these connections comprise a pivot portion provided with a grooved disk mounted thereon and a pivot strap riding on said disk so as to allow pivotal movement between said strap and disk. Obviously when the crank members revolve, the connecting rods 42 will reciprocate the platform connecting bar upwardly and downwardly and this movement will be controlled by the vertically movable guiding bar 39.

In order to shift the carrier bars elevated by the platforms across the abutting container walls, I preferably support in position to engage said carrier bars when so elevated, a series of duplicate shifting members 44, 45, and 46. As illustrated, the shifting members at each side of the receptacle are connected together and supported from the bottom of a drying chamber 47 hereinafter more particularly referred to and all of these members are preferably operated together by connecting them together by a rod 48 to form racks which are operated through the use of duplicate shifter mechanisms each comprising a bell crank lever 49 pivoted on a pivot 50 supported in a lug 51 at the bottom of the said drying chamber or compartment 47, said bell crank having an operating arm 49′ provided with a pin 49[a] adapted to be engaged by the said platform connecting bar in its upward movement to swing the bell crank about the pivot 50 and to cause the opposite arm 49[b] to move arcuate links 52 having a pivotal connection therewith, which links are connected to the shifter connecting rod 48 and moves the said rod and shifters in a horizontal plane.

It will be understood that upon the upward movement of the platform connecting bar, it will engage the studs or pins 49[a] to rock the bell cranks which will in turn move the links and cause a shifting of the shifter rod 48 with its depending shifters 44, 45 and 46 which will, during this shifting movement, engage carrier bars which have been elevated on said platform and shift them on said platforms forwardly into positions to clear the walls or partitions, so that upon the lowering of said platforms the vertical portions of the carrier bars with the frames and films carried thereby will be immersed in the immersing zone and the end portions of the horizontal carrier bars 10 will be disposed on the conveyor mechanism.

The reverse movement of said shifters is effected by having one of the arms of said bell crank 49 connected to one end of an expansion spring 53, the other end of which is anchored at a fixed point 53′ so that when the bar is lowered the shifter operating mechanism will be returned to initial position by said spring.

In order to enable the picking up of a carrier bar in its path by a platform, I preferably provide on each platform, resilient means adapted upon the downward movement of the platform to resiliently ride or slip over said bar but on the upward movement to engage the bar ends and retain the same on the platform.

Thus each of the transfer platforms are preferably provided with a spring clip 55 and at the end of the machine I also preferably provide on the transfer platform 35 a similar clip 55′ for engaging the carrier bar that has completed movement through the immersing zone movement, or reached the end of the machine. This platform will lift the ends of said bar into engagement with upwardly inclined surfaces 56 of an examining hooked rest 57 formed on the end of a track 58. This inclined surface will, during the elevations of the carrier, force the bar outwardly into engagement with additional spring fingers 59 carried by said transfer platform 35, which fingers, during further elevation, will resiliently retain the same in contact with said inclined surface and at the end of this movement force the same over the nose 60′ of a hooked rest 57 into engagement with notches or hollow portions 60 of said hooked rest 57 in which position the films are permitted to hang for a period which will permit examination thereof in wet condition by the illuminating unit 36.

It is desirable to permit the film and the carrier to be supported on the hook portion for a short time to permit examination and thereafter to move the same into the drying compartment 47 through which the films are moved with an intermittent movement in order to dry the same.

In the preferred apparatus shown, the films are raised or elevated out of the notches 60 in the hooked supporting or rest portions 57 by hooked arms 61 pivoted at 62 on opposite walls of the drying compartment 47 which arms are operated and synchronized with the raising and lowering movement of the elevating mechanism. These hooked arms 61 are, as shown, operated to swing about their pivots 62 by means of bell crank levers 63 having arms 63′ partially connected at $63^a$ to link arms 64 provided with slot and pin connections 64′ with the pivots 42′ on which the connecting rod 42 swings, the opposite arms $63^b$ of said bell-crank levers 63 being pivotally connected at $63^c$ to an operating rod 65 which is pivoted at 65′ to a pawl-mounting arm 66 pivoted on a shaft 68 and carrying a pivoted pawl 67 engaging a ratchet wheel 69 fixed on said shaft is mounted at opposite ends in the walls of the drying chamber, which extends through the drying chamber and has mounted at opposite ends thereof sprockets 70 supporting conveying chains 71 mounted at their opposite ends on sprockets 72.

It will be apparent that on each rocking of the bell-crank 63, by engagement with the arm 64 with the vertically movable pivot member 42′ will cause the ratchet wheel 69, shaft 68 and chains 71 to have an intermittent movement and at the same time will rock the hooked arms 61 to move a carrier rod out of the examining notch and along the arcuate track 73 into supported position on the chains 73.

The operation of the mechanism will be apparent from the foregoing description.

I preferably provide in the container 2 a cooling cell 77 and an outlet 77′. The container 3 is provided with an overflow pipe 78′ and an outlet 76. The container 4 has an outlet 79′ while the container 5 is provided with an agitating spray device 75 and provided with an inlet pipe 74 and said container 5 also has an outlet pipe 80′.

The drying chamber is provided with suitable heating and blowing means. As shown, I provide heating coils 83 and a chain 82 for the purpose of supplying heated air within the drying chamber.

Having described my invention, I claim:—

1. A film developing apparatus embodying, in combination, a receptacle to receive film treating solution, a film carrier embodying a carrier bar extending transversely of said receptacle and supporting a film within the solution in said receptacle, and means for moving said carrier bar to cause the movement of said film through the solution in a combined longitudinal and up and down motion.

2. A film developing apparatus embodying, in combination, a receptacle to receive film treating solution, a film carrier embodying a carrier bar extending transversely of said receptacle and supporting a film within the solution in said receptacle, and means for moving said carrier bar to cause the movement of said film through the solution in a longitudinal curvilinear path of movement.

3. A film developing apparatus embodying, in combination, a receptacle to receive film treating solution, a film carrier embodying a carrier bar extending transversely of said receptacle and supporting a film within the solution in said receptable, and means for moving said carrier bar to cause the movement of said film through the solution in a movement describing an elliptical curve.

4. A film developing apparatus embodying, in combination, a receptacle to receive film treating solution, a film carrier embodying a carrier bar extending transversely over said receptacle and supporting a film within the solution in said receptacle, and conveyer mechanism for moving said film through the solution in the receptacle arranged to successively engage, move the bar longitudinally of the receptacle and disengage the same.

5. A film developing apparatus embodying, in combination, a receptacle to receive film treating solution, a film carrier embodying a carrier bar extending transversely over said receptacle and supporting a film within the solution in said receptacle, and conveyer mechanism for moving said film through the solution in the receptacle arranged to move the bar in a series of successive lifting, conveying and depositing movements.

. PHOTOGRAPHY.

Search Room

89

6. A film developing apparatus embodying, in combination, a receptacle to receive film treating solution, a film carrier embodying a carrier bar extending transversely over said receptacle and supporting a film within the solution in said receptacle and conveyer mechanism for moving said film through the solution in the receptacle arranged to move the bar longitudinally of said receptacle in a series of successive movements in curvilinear paths.

7. A film developing apparatus embodying, in combination, a receptacle to receive film treating solution, a film carrier embodying a carrier bar extending transversely over said receptacle and supporting a film within the solution in said receptacle and conveyer mechanism for moving said film through the solution in the receptacle arranged to move said bar longitudinally of said receptacle in a series of successive movements in elliptical paths.

8. A film developing apparatus embodying, in combination, a receptacle to receive film treating solution, a film carrier embodying a carrier bar extending transversely over said receptacle and supporting a film within the solution in said receptacle, and conveyer mechanism for moving said film through the solution having a member movable in continuous curvilinear path of movement arranged to pick up the bar at one point in said movement, to carry it for a portion of said movement and disengage it in advanced position along said receptacle at another point in said movement.

9. A film developing apparatus embodying, in combination, a receptacle to receive film treating solution, a film carrier embodying a carrier bar extending transversely over said receptacle and supporting a film within the solution in said receptacle, and conveyer mechanism for moving said transverse bar to move a film supported thereby through the solution in the receptacle comprising duplicate notched stationary members and duplicate movable members having notches and moved to cause a set of notches in said movable members first to register with a set of notches in said stationary member and later to register with an adjacent set of notches in said stationary member, whereby a carrier bar supported in the first notch will be picked up and moved into a notch adjacent thereto.

10. A film developing apparatus embodying, in combination, a receptacle to receive film treating solution, a film carrier embodying a carrier bar extending transversely over said receptacle and supporting a film within the solution in said receptacle, and conveyer mechanism for moving said transverse bar to move a film supported thereby through the solution in the receptacle comprising duplicate notched stationary members and duplicate movable members having notches and moved in a continuous curvilinear path to cause a set of notches in said movable members in a forward point of said movement first to register with a set of notches in said stationary member and near the end of its forward movement to register with an adjacent set of notches in said stationary member, whereby a carrier bar supported in the first notch will be picked up and moved into a notch adjacent thereto.

11. A film developing apparatus embodying, in combination, a receptacle to receive film treating solution, a film carrier embodying a carrier bar extending transversely over said receptacle and a supporting film within the solution in said receptacle, and conveyer mechanism for moving said film through the solution in the receptacle comprising duplicate notched stationary members and duplicate movable members also having notches and moved in a continuous curvilinear path to cause a notch in said movable members at a point in the forward movement to register with a notch in said stationary member and near the end of its forward movement to register with an adjacent notch of said stationary member, said duplicate stationary and movable members having teeth with inclined side edges arranged between said notches, whereby a carrier-bar supported in one set of notches in the duplicate stationary members will be picked up and moved into a set of notches adjacent thereto, and the bars will be guided to the bottom of said notches.

12. A film developing apparatus embodying, in combination, a receptacle to receive treating solution comprising a plurality of separated film-immersing sections, each adapted to contain a different film treating solution, means for moving a film through the solutions in said sections in a combined longitudinal and up and down motion, and means at the end of said separate sections for lifting the film out of one section, moving it across the separating element and depositing it in the next adjacent section.

13. A film developing apparatus embodying, in combination, a receptacle to receive treating solution comprising a plurality of separated film-immersing sections, each adapted to contain a different film treating solution, means for moving a film through the solutions in said sections in a series of curvilinear advancing movements, and means at the end of said separate sections for lifting the film out of one section, moving it across the separating element and depositing it in the next adjacent section.

14. A film developing apparatus embodying, in combination, a receptacle to receive treating solution, comprising a plurality of separated film-immersing sections, each adapted to contain a different film-treating solution, means for moving a film through the solutions in said sections in a combined longitudinal and up and down motion, means at the end of said separate sections for lifting the film out of one section, moving it across the separating element and depositing it in the next adjacent section, means at the end of said receptacle for elevating a film out of the receptacle into an examination zone, and illuminating means arranged in said zone for examining a film so elevated.

15. A film developing apparatus embodying, in combination, a receptacle to receive treating solution, comprising a plurality of separated film-immersing sections, each adapted to contain a different film-treating solution, means for moving a film through the solutions in said sections in a series of curvilinear advancing movements, means at the end of said separate sections for lifting the film out of one section, moving it across the separating element and depositing it in the next adjacent section, means at the end of said receptacle for elevating a film out of the receptacle into an examination zone, and illuminating means arranged in said zone for examining a film so elevated.

16. A film developing apparatus embodying, in combination, a receptacle to receive treating solution comprising a plurality of separated film-immersing sections, each adapted to contain a different film treating solution, means for moving a film through the solutions in said sections in a combined longitudinal and up and down motion, means at the end of said separate sections for lifting the film out of one section, moving it across the separating element and depositing it in the next adjacent section, means at the end of said receptacle for elevating said film out of said receptacle, and means for further elevating said film into a drying zone.

17. A film developing apparatus embodying, in combination, a receptacle to receive treating solution comprising a plurality of separated film-immersing sections, each adapted to contain a different film treating solution, means for moving a film through the solutions in said sections in a series of curvilinear advancing movements, means at the end of said separate sections for lifting the film out of one section, moving it across the separating element and depositing it in the next adjacent section, means at the end of said receptacle for elevating said film out of said receptacle, and means for further elevating said film into a drying zone.

18. A film developing apparatus embodying, in combination, a receptacle to receive film treating solution comprising a plurality of separated immersing sections, each adapted to contain a different film-treating solution, a film-carrier embodying a bar extending transversely over said receptacle and supporting a film within the solution in said receptacle, conveyer-mechanism for moving said bars to move the film through the solution in the receptacle comprising duplicate notched stationary members and duplicate movable members having notches and moved in a continuous curvilinear path to cause a set of notches in said movable members, in a forward point of said movement, to register with a set of notches in said stationary member and near the end of its forward movement to register with an adjacent set of notches in said stationary member, and elevating mechanism for said bars comprising means moving in a vertical path and means moving in a horizontal path intersecting said vertical path for elevating said rod, shifting said rod while elevated and lowering the same.

19. A film developing apparatus embodying, in combination, a receptacle to receive film treating solution comprising a plurality of separated immersing sections, each adapted to contain a different film-treating solution, a film-carrier embodying a bar extending transversely over said receptacle and supporting a film within the solution in said receptacle, conveyer-mechanism for moving said bars to move the film through the solution in the receptacle comprising duplicate notched stationary members and duplicate movable members having notches and moved in a continuous curvilinear path to cause a set of notches in said movable members, in a forward point of said movement, to register with a set of notches in said stationary member and near the end of its forward movement to register with an adjacent set of notches in said stationary member, said duplicate stationary and movable members having teeth with inclined side edges arranged between said notches and elevating mechanism for said bars comprising means moving in a vertical path and means moving in a horizontal path intersecting said vertical path for elevating said rod, shifting said rod while elevated and lowering the same.

20. The method of handling films consisting in supporting a film on a receptacle containing a treating liquid, immersing said supported film in said treating liquid, and repeatedly engaging, lifting, traversing and depositing said film-support to cause said immersed film to have a combined raising, lowering and conveying movement in the said liquid.

21. The method of handling films consisting in supporting a film on a receptacle containing a treating liquid, immersing said supported film in said treating liquid, and repeatedly at substantially regular intervals engaging, lifting, traversing and depositing said film-support to cause said immersed film to have a combined up and down and horizontal movement.

22. The method of handling films consisting in supporting a film on a receptacle containing a treating liquid, immersing said supported film in said treating liquid, and successively at substantially regular intervals engaging, lifting, traversing and depositing said film-support to cause said immersed film to pass through said solution with a series of combined up and down and horizontal motions, elevating the films out of the said solution with an independent movement, shifting it, lowering it into immersion in another solution and causing it to pass through said second solution with a series of similar motions.

23. A film-developing apparatus embodying, in combination, a receptacle to receive a treating solution, a carrier embodying a carrier bar extending transversely of said receptacle and supporting an article to be treated within the solution in said receptacle, and a conveyer mechanism for moving said carrier bar to cause the movement of said article through the solution comprising a pair of bars mounted on each side of said receptacle and having notches at their upper surfaces, one of the members of each pair of bars having a relative movement across the plane and in a direction longitudinally of the other member to cause the notches in such relatively movable member first to register with one set of notches in the other member and later to register with another set of notches in the same member in advance of the set of notches first mentioned.

24. A film-developing apparatus embodying, in combination, a receptacle to receive treating solution, comprising a plurality of separated film-immersing sections each adapted to contain a different film-treating solution, a plurality of film carrier bars extending transversely of said receptacle over a plurality of said sections and supporting films within the solutions in the said sections, means for traversing the said carrier bars from the forward to the rear end of each of said plurality of sections to cause the movement of said films carried thereby through the solutions in said sections, and means for simultaneously lifting all those film carrier bars and films which have reached the rear ends of the sections, moving said bars and films carried thereby across the separating elements and depositing them in adjacent sections.

25. A film-developing apparatus embodying, in combination, a receptacle to receive treating solution, comprising a plurality of separated film-immersing sections each adapted to contain a different film-treating solution, a plurality of film-carrier bars extending transversely of said receptacle over a plurality of said sections and supporting films within the solutions in the said sections, a single mechanism movable as a unit for traversing the said carrier bars from the forward to the rear end of each of said plurality of sections to cause the movement of said films carried thereby through the solutions in said sections,

9.. PHOTOGRAPHY.
89 and means, including a pair of vertically-movable longitudinally-disposed bars extending over a plurality of said separated film immersing sections, for simultaneously lifting all those film carrier bars and films which have reached the rear ends of the sections, moving said bars and films carried thereby across the separating elements and depositing them in adjacent sections.

26. A film handling apparatus embodying, in combination, a receptacle to receive a treating solution, comprising a plurality of separated film immersing sections each adapted to contain a different film-treating solution, a plurality of film-carrier-bars extending transversely of said receptacle over a plurality of said sections and supporting films within the solution in said sections, a step-by-step conveying mechanism at the side edges of said receptacle for traversing in a step-by-step movement said carrier bars and films from the forward to the rear ends of each of said plurality of sections, and a mechanism operable during the stationary interval of said step-by-step movement of said carrier bars to engage all those film carrier-bars which have reached the rear ends of the sections, to elevate said carrier-bars and films across the separating elements and to deposit the same on said step-by-step conveying mechanism at the opposite sides of said separating elements in adjacent tank sections.

WALTER J. WILLIAMS.